Aug. 27, 1929.  M. TIBBETTS  1,726,202
LOCKING MECHANISM
Filed April 28, 1926   2 Sheets-Sheet 2

WITNESS:  INVENTOR

Patented Aug. 27, 1929.

1,726,202

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

LOCKING MECHANISM.

Application filed April 28, 1926. Serial No. 105,098.

This invention relates to locking mechanism and particularly to locking mechanism for motor vehicles.

With the enormous number of motor vehicles now in use, the problem of preventing the stealing of them has become acute. Automobiles must generally be left in the street and they cannot always be provided with an attendant. The large production of certain makes of vehicles has made their construction familiar to most people and no special knowledge is required to drive them.

Insurance is generally resorted to by the owner and with this has come more or less carelessness, or perhaps it may be called disregard, on the part of the owner in the matter of taking ordinary precautions to prevent theft. Thus, though practically every car is equipped with some kind of lock, it is a known fact often stated, and regretfully so, by the insurance underwriters that a very large number of owners of automobiles fail to lock their cars when leaving them for either short or long periods.

Many effective locking devices have been provided but effective means for making the owner lock his car have been lacking. Obviously the most effective locking devices are of on avail if the key is left in the lock or if the locking device is not left in theft-resisting position.

It is very evident, therefore, that the human element is of the greatest importance and probably requires the greatest amount of consideration in designing a locking means for motor vehicle that will be really effective in retarding or preventing theft thereof.

It is one of the objects of the present invention to provide a locking mechanism that will require less effort on the part of the operator to leave it in locked or theft-resisting position than to leave it in unlocked or non-theft-resisting position.

Generally speaking, the motor vehicle owner does not like to be delayed in starting his car, which is one of the reasons why he so frequently leaves it unlocked. He likes to come back to his car and throw the ignition switch with a single movement and step on the starting pedal and know that he can immediately get under way. This is probably why some of the so-called "coincidental" locks are not very popular with their owners, and this is why the effectiveness of those locks is frequently defeated by the owner leaving the key in the lock. For, with the so-called "coincidental" lock, generally speaking, some part of the car is automatically locked when or before the ignition lever is thrown to "off" position to stop the engine and it is then necessary to use the key to unlock the vehicle. It is the getting of his key from his pocket and using it in the lock that the owner dislikes and this is doubtless why he so often leaves the key in the lock when he expects to be gone from his vehicle only a few minutes. If he puts the key in his pocket, he must take it out and insert it in the keyhole when he returns to his car and his start is, therefore, delayed.

It is one of the objects of the present invention to provide a locking means for motor vehicles such that the manual operation of stopping and locking the vehicle requires less effort, or at least no greater effort, on the part of the operator than stopping the vehicle without locking it, while at the same time the operation of starting the vehicle again or unlocking it is made no more difficult and requires no more time on the part of the operator than is required in operating the usual ignition switch mechanism of most of the motor vehicles of today.

Another object of the invention is to provide a locking mechanism for motor vehicles that may, when in its theft-resisting position, be operated or moved to its unlocked position with a very simple manipulation of parts and without the use of a key.

Another object of the present invention is to provide a locking mechanism for motor vehicles in which a very simple keyless device may be used for holding the mechanism in theft-resisting position and in which the mechanism or the vehicle will become additionally locked upon the wrongful manipulation of said keyless mechanism, whereby the person attempting to defeat the lock will, unless he properly manipulates the keyless mechanism in the first instance, lock himself out, so that thereafter manipulation of the keyless mechanism will not permit him to unlock the other parts of the mechanism.

It has been proposed to use combination locks on motor vehicles, that is, locks of the type used on safes, whereby the owner may easily lock his car and may be able to unlock it without the use of a key. These locks, however, have been found to be unpopular due to the necessary delay and difficulty in unlocking the vehicle, it usually being necessary to turn one or more dials or to turn one dial back and forth several times with stops at definite points. This is particularly trying at night, and it is not practicable to place these dials where they may be easily read and consequently the operator has difficulty in manipulating them in the unlocking process.

There are of course some very simple combination locking mechanism such, for instance, as that shown in the old Tucker patent Reissue 5,566, dated September 9, 1873, which may be operated by a single movement of the operator's fingers, but this simple form of combination lock mechanism would not be practicable if adapted to an automobile and depended upon entirely because the number of combinations is necessarily limited and a thief could, in a short time, try all of the combinations and eventually find the right one.

It is one of the objects of the present invention to provide a motor vehicle with locking means in which a simple combination lock is employed together with other locking mechanism which will retain the locking means in locked position upon the wrongful manipulation of the combination locking means.

Another object of the invention is to provide a locking mechanism having dual releasing means, one of which becomes the sole releasing means upon the wrongful manipulation of the other means.

Another object of the invention is to provide a locking mechanism having dual releasing means, one of which becomes inoperative as a releasing means upon being wrongfully manipulated.

Another object of the invention is to provide a dual locking means, one of which becomes operative only upon manipulation of the other in one of several predetermined ways.

Another object of the invention is to provide a locking mechanism in which there are devices capable of several different manipulations and only one of which said manipulations will unlock the mechanism and any other of which will effect a further locking of the mechanism.

Another object of the invention is to provide a motor vehicle with a locking mechanism for locking and releasing a part of the vehicle, which mechanism has a device capable of several different manipulations, one only of which will release the vehicle and any other of which will additionally lock it.

Another object of the invention is to so combine a combination lock with an additional lock that the wrongful manipulation of the combination lock will throw the additional lock into locking position.

Another object of the invention is to provide a locking mechanism which will so combine a key release means with a combination release means that the key release means only will release the mechanism after the combination means has been wrongfully manipulated.

With coincidental locks such as above referred to, when the car is to be left in a garage the key is usually left in the lock so that the attendant can move the car. The present invention contemplates making this unnecessary so that the owner may be given every encouragement to keep his key in his pocket, and the invention, therefore, provides means for leaving the car unlocked without using the key or without leaving the key in the lock, which means, however, requires more effort on the part of the operator to so leave his car unlocked than it does to stop the car and lock it.

It is a further object of the invention to provide means for reminding the owner or operator that the key should not be left in the lock, and in the present invention this is in the form of means for partially or fully ejecting the key from the lock as the lock or the lock member is moved to the "off" position of the switch.

Other objects of the invention will appear from the following description taken in connection with the drawings, which form a part of this specification, and in which.

Figures 1, 3:
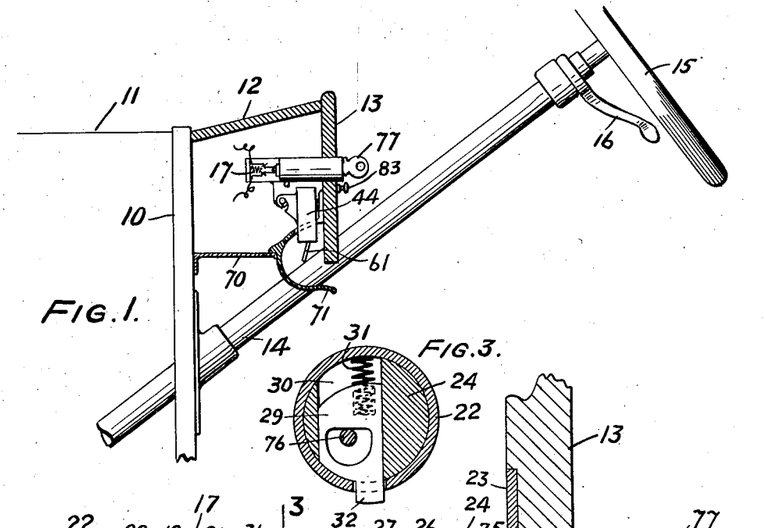
Fig. 1 is a side view of a part of a motor vehicle embodying the invention.
Fig. 3 is a section on the line 3—3 of Fig. 2.

Referring to the drawings, a portion of a motor vehicle is shown in Fig. 1, 10 representing the dash, 11 the bonnet or hood extending over the engine, 12 the cowl, 13 the cowl board or instrument board, and 14 the steering column upon which is the steering wheel 15 and one of the control rods 16.

Figure 5:
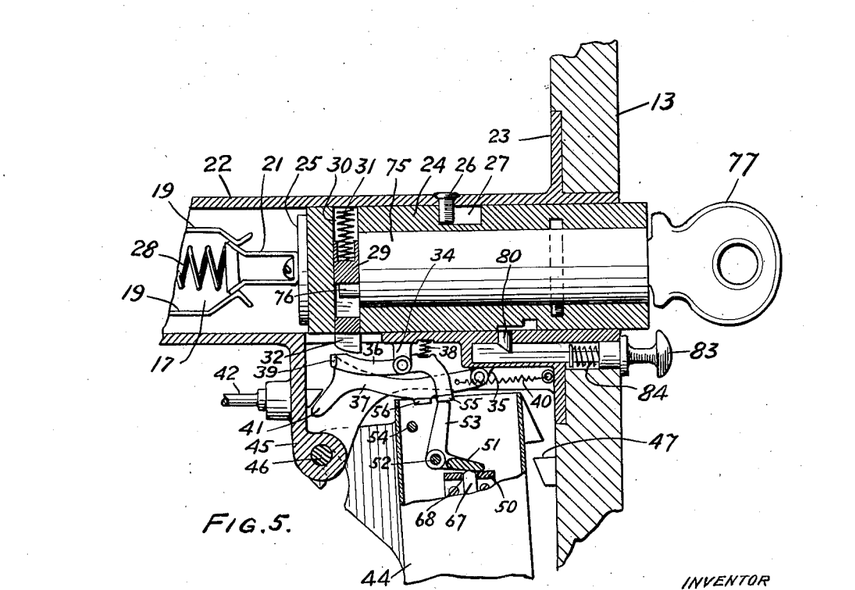
Fig. 5 is a section similar to Fig. 2 showing the lock plunger in a different position.

Means for starting and stopping the engine are mounted beneath the cowl 12, this means being shown in the form of a switch mechanism 17 which may be so connected with the engine that the making and breaking of the circuit will throw the ignition "on" or "off" or otherwise start and stop the engine. Any desirable form of switch mechanism may be used and it may be so timed in co-operation with the locking means hereinafter described that the circuit will be broken either siultaneously with or just before or just after the locking of the mechanism. In the form shown, the switch mechanism is mounted on an insulated base 18 from which extend flexible fingers 19 to which the ignition or other wires 20 are connected. A U-shaped connecting piece 21 is adapted to be moved relative to the fingers 19 so that the connection between the fingers may be either made or broken, according to the position of the U-shaped piece 21. In Figs. 1 and 5 the switch mechanism is shown in its closed position, and in Fig. 2, the switch is shown with the circuit broken or with the ignition "off".

The switch mechanism 17 is preferably supported under the cowl 12 and, as shown, it is connected to the instrument board. Thus, a support 22 for the mechanism substantially in the form of a tube has a flange 23 by which it is connected to the instrument board 13. Sliding within the tubular support 22 is a member or plunger 24 which carries the contact piece 21 through a block of insulation 25. The insulation block 18 is mounted in the end of the tubular support 22 as shown and thus the parts 19 and 21 are relatively supported for making and breaking the contact. A stop 26 operating in a slot 27 limits the sliding movement of the member 24 and prevents it from turning in the tube 22, and a spring 28 yieldingly presses the member or plunger 24 towards the right or outwardly from the instrument board.

It will be seen that the plunger 24 may thus be reciprocated within the support for the purpose of making or breaking the electrical connection, the plunger being pressed outwardly by the spring 28 and being adapted to be pushed inwardly by the operator. This plunger 24 is the member that is desired to be locked in its "off" position so that the engine cannot be started by connecting the contacts 19.

Shown as adjacent the inner end of the plunger 24 is a latch 29 sliding in a transverse slot 30 and spring pressed downwardly by a spring 31. The latch 29 has a nose 32 which extends through and slides in a slot 33 in the tube 22, as the plunger 24 is reciprocated in the tube.

Figure 2:
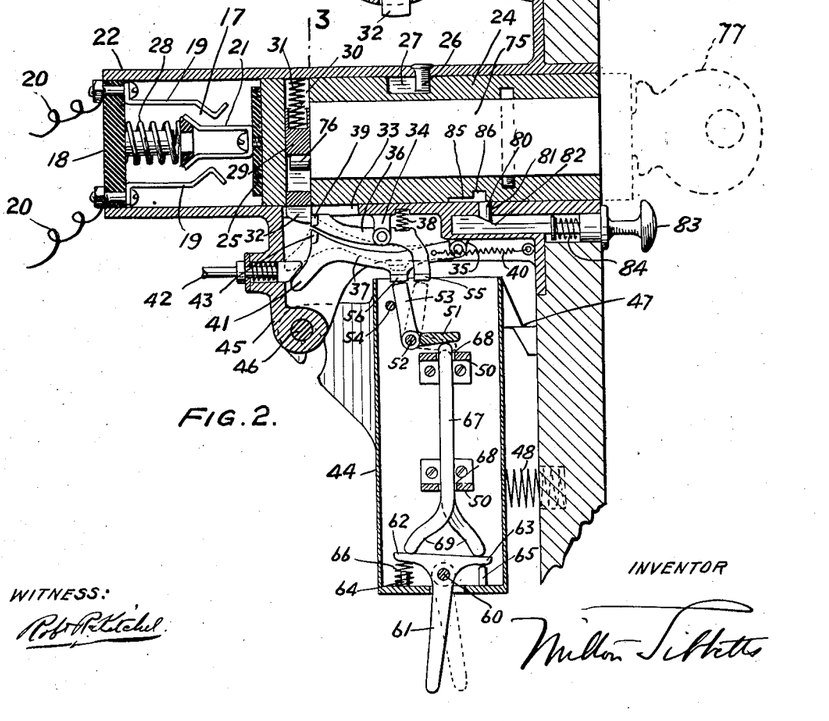
Fig. 2 is an enlarged section through the vehicle instrument board and the locking mechanism attached thereto.

Suitably supported as by lugs 34 and 35 upon the support 22 are two detents or similar devices 36 and 37 respectively. The detent 36 has a spring 38 which yieldingly presses the end 39 of the detent upwardly or towards the tube 22. This end 39 of the detent 36 is arranged in the path of the nose 32 of the latch 29 as the latter is moved from one position to another. Its spring 38 is preferably overcome by the latch 29 so that when the latch is pushed from right to left the detent will be pushed outwardly but will snap back into place as shown in Fig. 2 so that it catches in front of the nose 32 and thereby retains the plunger in the position shown. Thus the plunger 24 may be pushed from the position shown in Fig. 5 to the position shown in Fig. 2 and the latch 29 will catch on the detent 36 and the latter will hold the plunger until either the latch or the detent is moved to release it.

The detent 37 is provided with a snap-over spring 40 which yieldingly holds it in either of two positions; thus it is yieldingly held in the position shown in full lines in Fig. 2 or it may be likewise yieldingly held in the position in which it is shown in dotted lines in Fig. 2. This detent is also pushed back from its dotted line position to its full line position by the latch 29 when the latter is moved from right to left and this movement may be said to reset the detent 37 after it has been moved to its dotted line position.

The detent 37 is also formed with a cam part 41 which may act upon a locking device 42 to move the latter from right to left as the detent is moved from its full line position to its dotted line position, as will be hereinafter explained. This locking device 42 is adapted for connection to any of the controls of the vehicle, such as the steering or transmission or to a valve in the gasoline line or intake passage or other essential connection for the purpose of rendering the vehicle unusuable when said device is moved to its left hand position.

From the above, it will be seen that the plunger 24 may be released either by withdrawing the end 39 of the detent 36 or by moving the latch 29 upwardly so that its nose clears the detent. The spring 28 will then push the plunger 24 towards the right and thus close the switch device 17.

It will also be seen that if the detent 37 is moved upwardly so that its free end 43 is in the path of the nose 32 of the latch 29, the detent will be held in that position by its spring 40 and the plunger 24 will be retained against movement to the right even should the detent 36 thereafter be moved to its releasing position. However, even with the detent 37 in its locking or dotted line position, the plunger 24 may be released by moving the latch 29 upwardly so that its nose will clear both of the detents.

Means are provided for manually operating the detents 36 and 37 so that the plunger may either be released, as by withdrawing the detent 36, or be additionally locked as by moving the detent 37 into locking position. Whether one or the other of these detents is operated will depend upon the particular manipulation of the device about to be described. Preferably this is a combination device permitting several different manipulations one specific manipulation of which will move the detent 36 to releasing position, and any other manipulation of which will leave the detent 36 where it is and move the detent 37 to its locking position. Thus, in order to release the plunger with the combination mechanism referred to, it will be necessary for the operator to, in the first instance, make the proper manipulation of the device or otherwise he locks himself out as it were and places the mechanism in such position that it can not thereafter, without being reset, be released by the combination means.

Figure 4:
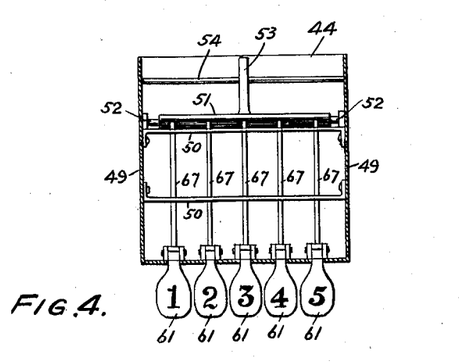
Fig. 4 is an elevation, with parts in section, illustrating the dial mechanism.

As shown, this device which is capable of several different manipulations, comprises a casing 44 pivoted to a suitable lug or other part 45 on the support 22, as by the pin 46, and having a positioning stop 47 and a retracting spring 48. This casing 44 is somewhat rectangular in shape as shown in Figs. 2 and 4, having end walls 49 and guide plates 50 connected between the end walls. Just above the upper guide plate is a movable plate 51 pivoted or trunnioned in the casing 44, as at 52. The plate 51 has an upwardly extending arm 53, and a stop 54 limits the left hand swing of the arm and plate. Swinging motion in the other direction is stopped by the plate 51 resting on the upper plate 50 above referred to, and in this position the arm 53 is directly beneath the end 55 of the detent 36, this end being on the opposite side of the fulcrum of that detent from its end 39. This is the dotted line position of the plate 51 and its arm 53. In its full line position the arm 53 is entirely out from under the arm 55 of the dentent 36 and is directly under and adjacent to a shoe 56 on the detent 37 between its end 43 and its fulcrum.

Now it will be evident that if the casing 44 is moved about its pivot 46 against the action of the spring 48 when the arm 53 is in its dotted line position as shown in Fig. 2 or the full line position as in Fig. 5, said arm 53 will push one end of the detent 36 upwardly against its spring 38 and the end 39 of said detent will be withdrawn from holding position in front of the latch 29 and will thus release the latch. This releasing of the latch will permit the spring 28 to push the plunger 24 towards the right and the switch device 17 will be closed, thus starting the engine or permitting the engine to be started.

It will be equally obvious that when the casing 44 is rocked upwardly about its pivot 46 with the arm 53 in its full line position of Fig. 2, the detent 36 will not be acted upon but the detent 37 will be pushed upwardly into locking position and its spring 40 will snap it over and hold it in that position. No rocking of the casing 44 thereafter, regardless of the position of the arm 53, will have any effect in releasing the plunger 24 from its rocking position because the detent 37 will hold it there regardless of whether the detent 36 is withdrawn or not.

Means for determining the position of the operating arm 53 and plate 51, and for rocking the casing 44, will now be described. Mounted upon a suitable pivot pin 60 near the lower end of the casing 44 are a plurality of dials or finger pieces 61. Five of these dials are shown in Fig. 4 and they are numbered consecutively merely for convenience in describing their operation. These dials are mounted for independent movement and each of them has oppositely extending arms 62 and 63 which co-operate with stops 64 and 65 respectively to limit the movement of the dials. A spring 66 for each dial holds it yieldingly in the full line position shown in Fig. 2 and in operating any one or several of the dials 61, the springs 66 will be overcome before the casing 44 will be moved against its spring 48.

For each of the dials 61 there is a combination link 67 which links are adapted to extend through openings 68 in the guide plates 50 so that the upper ends of these links are directly beneath and may bear against the plate 51. The lower end of each of these links 67 is bent out of line as shown at 69 so that in one position of the link its lower end may bear against the arm 62 and in the reverse position its lower end may bear against the arm 63. Preferably these links are rectangular in form and extend through rectangular slots in the guide plates 50 so that after they have been dropped in place they will not rotate in the guides. The desired combination may be made up by placing some of the links 67 with their lower ends resting on arms 62 and some of them with their lower ends resting on arms 63.

In the normal position of the dials 61 in which the arm 63 rests against the stop 65, the arms 62 and 63 are slightly inclined to the horizontal, and the length of the links 67 is such that those having their lower ends resting against the arms 62 are holding the plate 51 in its raised position with the arm 53 against the stop 54, this arm 53 being directly beneath the shoe 56 of the detent 37. It is evident that any rocking of the casing 44 without operating any of the dials 61 would of course push the detent 37 into locking position. The same thing would happen if any one of the dials 61, having a link 67 resting against its arm 63, should be operated because in that case that link 67 would be pushed upwardly to thereby hold the plate 51 in its upper position even if the other links that were previously holding it should be withdrawn. However, if all of those and only those dials 61 are rocked or operated which have the links 67 resting against their arms 62, those links which support the plate 51 would be withdrawn and the plate 51 would drop down so that its arm 53 would be in dotted line position. Then if the pull is continued on the dials 61 so that the casing 44 is rocked on its pivot 46, the said arm 53 will push the end 55 of the detent 36 upwardly and the end 39 thereof will be withdrawn from in front of the latch 29 and the plunger 24 will be released. When the operator relieves the pressure on the keys or dials 61, the casing 44 and the parts mounted in it will return to their normal positions and this is true also of the detent 36 so that the parts are again ready to go through the cycle of operation.

Of course the combination of the dials can be readily changed by removing the casing 44 from its pivot and changing the arrangement of the links 67, remembering that those dials that it is desired to use in the combination must have their respective links with the lower ends resting on the arms 62, and all of the others must rest on the arms 63 of the dials.

In order that the mechanism may not be tampered with or wired around, it is preferably encased in any suitable manner as by providing a plate 70 which completes the housing around the mechanism. Also, in order that the dials 61 may not be readily inspected to see which of them have been most used, a guard 71 may be provided beneath the dials, it being only necessary to leave sufficient room between the dials and the guard for the fingers of the operator's hand to be inserted.

Means are provided for releasing the plunger 24 by another operation than through the dial mechanism and this may be in the form of either a combination lock or a key operated lock, the barrel or cylinder of which is indicated at 75 as mounted within the plunger 24. An eccentric 76 operated by the lock cylinder is adapted to retract the latch 29 from its position behind the detent 36. It will be seen that even though the detent 37 has been snapped into locking position this movement of the latch 29 will disengage it from that detent also.

A key 77 is provided for the lock cylinder 75, and as this cylinder is in the plunger 24 the key is in the way when the plunger is pushed in. Therefore, the key should be withdrawn from the plunger before the latter is pushed to break the ignition circuit. Thus, it is easier for the operator to keep his key in his pocket than it is to try to push in the plunger with the key in place. Moreover, as the key is not ordinarily required for releasing the plunger, it will usually be kept in the operator's pocket and the plunger will be released by operating the dials 61.

When the vehicle is left in a public garage or in a parking lot where there is an attendant, it is often desirable to leave it unlocked so that the attendant may move the vehicle from one place to another. Of course the key may be left part way in the lock or it may be left with the attendant, but this is sometimes undesirable, particularly since it would thereby enable the attendant or some other unauthorized person to try out the various combinations until he had discovered the correct one. Means have, therefore, been provided for leaving the plunger 24 in unlocked position, and this means is purposely designed so that it will be more difficult or will require more effort on the part of the operator to leave the plunger in unlocked position than it will be for him to leave it in locked position. Preferably the mechanism will require the operator to use both hands to move it to "off" but unlocked position. Thus, there is what may be called a temporary locking bolt 80 mounted in a transverse bore 81 in the tube 22. This bolt 80 may be moved towards the plunger 24 by a wedge-shaped rod 82 having a hand knob 83 outside of the instrument board 13 adjacent the exposed end of the plunger. A spring 84 yieldingly holds the rod 82 in its inner position. Formed in a suitable part of the plunger 24 is a longitudinal groove 85 of very slight depth throughout most of its length but deeper at one end, as shown at 86. When the plunger 24 is in its outer position the bolt 80 may be pushed into the shallow end of the groove 85 by pulling outwardly the rod 82, and with the rod held in that position the plunger 24 may then be pushed inwardly until the opposite end of the groove 85 abuts against the bolt 80. Additional movement of the rod 82 will then push the bolt 80 into the deeper part 86 of the groove and the plunger 24 will then be held in that position. The plunger has thus been pushed in far enough to break the switch connection 17 and yet it requires neither a key nor the manipulation of the dials 61 to release it. The plunger is released by simply pushing in on it very slightly so that the bolt 80 will drop by gravity or other means out of the slot 85, 86. The plunger will then return to its outer or "on" position. Then if the attendant wishes to stop the engine so that he can start it again, he must pull the knob or button 83 out at the same time that he pushes in the plunger 24. Otherwise he will push the plunger in so that it is caught by the detent 36 and it can then only be released by properly manipulating the combination mechanism of the casing 44 or by using the key in the cylinder barrel 75.

The operation of the various parts of the mechanism has been set forth in the description of it. More in a general way the operation may be amplified somewhat as follows:

When the owner of a vehicle equipped with this mechanism pulls up to the curb where he intends to leave his car he stops the engine by simply pushing in the plunger 24 as far as it will go. The key is in his pocket because he never has to use it except when someone has been tampering with the lock mechanism. The car is automatically locked by this movement of the plunger 24 and of course the ignition is "off" and the engine stopped. The mechanism is in what may be said to be the theft-resisting position. The owner has been able to lock his car by the simplest of operations and he knows that he can start it again by a very simple operation and that he will not have to take his key from his pocket to do so, unless, of course, the lock has been tampered with in the meantime, or unless, perchance, he forgets the combination of the mechanism 44, in either of which events, he will have to use his key to withdraw the latch 29 from its position behind the detent 36.

But in the usual order of events the owner will return to his car, put his fingers on dials 1 and 3 (assuming that the links 67 over those dials are set with their lower ends on the arms 62 and that the other three links are resting on the arms 63) and pull those dials toward him. This will result in first rocking the dials 1 and 3 so that their links 67 will withdraw their support from the plate 51 and the arm 53 will, therefore, be moved to its dotted line position in Fig. 2 so that it is beneath the end 55 of the detent 36. Next, the casing 44 will be rocked on its pivot 46 and the arm 53 will thereupon operate the detent 36 to release the latch 29 and the plunger 24 will immediately snap into its original or "on" position as shown in Fig. 5, the switch 17 having been closed in this operation. This starts the engine or enables it to be started by cranking and the whole operation of stopping and starting has been done as easily as if the mechanism had never been locked.

If, in the absence of the owner, some unauthorized person endeavors to start the car, he will first have to make a guess as to the combination. Of course there is the bare possibility that his first guess will be correct and in that event he will be able to start the car as easily as the owner, but this possibility is rather remote due to the large number of combinations available with the dials 61 and therefore, if this thief operates dials 3 and 4, for instance, or even 1, 3 and 4, the operation of dial 4 will move its corresponding link 67 upwardly so that the plate 51 is held in its upward position regardless of the withdrawing of either or both of the dials 1 and 3. Rocking of the casing 44 then pushes the arm 53 into contact with the detent 37 and that detent is snapped over into its dotted line position so that its end 43 is set in front of the latch 29. Even should the thief then correctly guess the combination and pull dials 1 and 3, this would merely release the detent 36 and leave the detent 37 still holding the plunger 24 in its "off" position, and no amount of manipulation of the combination mechanism will change this result. It has become inoperative as a releasing means.

When the owner returns to his car and finds that he cannot release the plunger by manipulating the combination properly he knows that it has been tampered with and he must then use his key to withdraw the latch 29. The detent 37 remains in its set position but the next movement inwardly of the plunger 24 resets the detent 37 by reason of the nose 32 of the latch pushing the detent against the action of its spring 40, which spring then snaps the detent 37 back into its original position.

After the owner has thus unlocked his car by the use of the key he will probably return the key to his pocket, but if he does not do so, he will immediately be reminded of it the next time he stops the car because the key will be in his way when he attempts to push in the plunger 24.

Now in the event the owner drives into a garage where he wishes to have some work done on his car or where it is necessary to leave the car so that the attendant can move it to permit other cars to be run in or out, the owner goes to a little more trouble in stopping his car. He pulls the button 83 outwardly and then pushes the plunger 24 in until it stops against the bolt 80. As he still has pressure on the button 83, the bolt 80 is pushed into the deeper slot 86. This holds the plunger 24 with the ignition "off" and yet the latch 29 has not reached its locking position behind the detent 36. The attendant, therefore, may start the car by pushing slightly on the plunger 24 which drops the bolt 80 out of the slot 86 and the plunger 24 then returns to its "on" position. The attendant cannot play with the locking mechanism and endeavor to find out the combination because if he pushes in the plunger 24 so that it is caught by the latch 29, he will not thereafter be able to start the car unless he happens to guess the combination the first time. He will, therefore, stop the car as the owner stopped it, that is, by pulling on the button 83 at the same time he pushes in the plunger 24.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with a part thereof to be locked, of means for locking and releasing said part including a device capable of several different manipulations, one only of which will release the part and any other of which will additionally lock it.

2. In a motor vehicle, the combination with a part thereof to be locked, of means for locking and releasing said part including a device capable of several different manipulations, one only of which will release the part and any other of which will additionally lock it so that it cannot thereafter be unlocked by the release manipulation.

3. In mechanism of the class described, the combination of a member to be locked, a device for locking said member, means for releasing said device, a device for additionally locking said member, and means capable of several different manipulations, one of which will release the first said locking device and another of which will move said additional device into locking position.

4. In mechanism of the class described, lock releasing means capable of several different manipulations, one of which will release the lock and another of which will make the lock releasing means ineffective.

5. In mechanism of the class described, the combination of a key operated lock device, and lock releasing means separate from the key capable of several different manipulations, one of which will release the lock and another of which will make said releasing means ineffective.

6. In mechanism of the class described, the combination of lock releasing means, means for making the lock releasing means ineffective, and a device for operating either one or the other of said means.

7. In mechanism of the class described, the combination of lock releasing means, means for making the lock releasing means ineffective, and a device capable of several different manipulations, one of which will operate the first said means and another of which will operate the second said means.

8. In locking mechanism, the combination of two locking devices, means for moving one of said locking devices into locking position, means for releasing the last named locking device from said locking position, and means for rendering ineffective said releasing means and simultaneously moving the second locking device into locking position.

9. In locking mechanism, the combination of two locking devices, means for moving one of said locking devices into locking position, means for releasing the last named locking device from said locking position, and means for rendering ineffective said releasing means and simultaneously moving the second locking device into locking position and holding it there.

10. In locking mechanism, the combination of a member to be locked, a detent for holding said member in locked position, a second detent normally inoperative, and means for operating either of said detents.

11. In locking mechanism, the combination of a member to be locked, a detent for holding said member in locked position, a second detent normally inoperative, and a combination device connected to operate said detents.

12. In locking mechanism, the combination of a member to be locked, a detent for holding said member in locked position, a second detent normally inoperative, a combination device connected to operate said detents, and key operated means for releasing said member from both said detents.

13. In locking mechanism, the combination of a member to be locked, a detent for holding said member in locked position, a second detent normally inoperative, and a combination device adapted in one position to operate the first detent to release the member and in another position to operate the second detent to additionally hold the member in locked position and render the device thereafter inoperative for releasing said member.

14. In locking mechanism, the combination with a member to be locked, of a spring pressed detent for normally retaining the member in locked position, a second detent having snap-over spring means for retaining it in either of two positions, means for operating said detents, and means on said member for resetting said second detent to inoperative position.

15. In locking mechanism, the combination of a member to be locked, two detents either of which is adapted to retain said member in locked position, and a key operated device for releasing said member from either or both of said detents.

16. In locking mechanism, the combination of a member to be locked, two detents either of which is adapted to retain said member in locked position, and a manually operated device for releasing said member from either or both of said detents.

17. In locking mechanism, the combination of a member to be locked, two detents either of which is adapted to retain said member in locked position, a combination device for operating either of said detents whereby the operation of one of said detents will release the member and the operation of the other said detent will additionally hold said member in locked position, and manually operated means for releasing said member from either or both of said detents.

18. In locking mechanism, the combination of a member to be locked, two detents either of which is adapted to retain said member in locked position, a combination device for operating either of said detents whereby the operation of one of said detents will release the member and the operation of the other said detent will additionally hold said member in locked position, and key operated means for releasing said member from either or both of said detents.

19. In a motor vehicle locking mechanism, a spring pressed member adapted to close the ignition when in one extreme position and to open said ignition when moved from that position, means whereby the operator may move said member against its spring to break the ignition, means for automatically retaining said member in the position to which it has thus been moved, and two separately operable means for releasing said member so that its spring may return it to ignition "on" position.

20. In a motor vehicle, the combination with a switch, and means for locking the switch, of a locking bolt and means for operating the bolt for either (a) opening the switch and automatically locking it or (b) opening the switch without automatically locking it, at the will of the operator, the structure of the locking bolt and its operating means being such that opening the switch and automatically locking it requires less effort on the part of the operator than that of opening the switch without locking it.

21. In a motor vehicle, the combination with a switch, and means for locking the switch, of a locking bolt and means for operating the locking bolt for either (a) opening the switch and automatically locking it or (b) opening the switch without automatically locking it, at the will of the operator, the structure of the locking bolt and its operating means being such that the opening of the switch and automatically locking it may be performed with a single manipulation of the operator and the opening of the switch and retaining it in unlocked position requires several manipulations of the operator.

22. In a motor vehicle, the combination with its operating devices, of locking means for one of said devices designed to prevent normal operation of the vehicle, a secondary locking device, and means capable of several different manipulations, one manipulation only of which will release said locking means and any other manipulation of which will effect a further locking of said means and a locking of said secondary locking device.

23. In locking mechanism, the combination with a member to be locked, of a device for locking said member, a combination device for releasing said member from locked position, and means for automatically locking said member additionally upon the manipulation of said combination device on anything but the predetermined combination.

24. In locking mechanism, the combination with a member to be locked, of a device for locking said member, a combination device for releasing said member from locked position, means for automatically locking said member additionally upon the manipulation of said combination device on anything but the predetermined combination, and means for maintaining said automatically locking means in its locking position regardless of the further manipulation of said combination device.

25. In locking mechanism, the combination of a locking member having a limited movement and spring pressed in one direction, means for automatically locking said member when it is moved to its spring compressed position, and a manually operated device for retaining said member in an intermediate position.

26. In locking mechanism, the combination of a locking member having a limited movement and spring pressed in one direction, means for automatically locking said member when it is moved to its spring compressed position, and a manually operated device for temporarily retaining said member in an intermediate position and for releasing said member when the latter is moved slightly from said intermediate position towards its spring compressed position.

27. In locking mechanism, the combination with a detent, of means co-operating to release said dentent comprising a pivoted casing, a movable member on said casing adapted in one position to act on said detent as said casing is moved on its pivot and in another position to clear said detent when the casing is so moved, a plurality of dials mounted on said casing, an operating link extending from each of said dials to said movable member, whereby the dials may be operated to move said movable member and the casing may be moved on its pivot in co-operation with said detent.

28. In a motor vehicle, the combination with a part thereof to be locked, of a keyless mechanism capable of several different manipulations, one only of which will release the part and any other of which will render the keyless mechanism inoperative as a releasing means and a key operated mechanism for releasing said part.

29. In a motor vehicle, the combination with a switch, of an automatic lock device for retaining said switch in open position, and a normally inoperative device movable by the operator to retain said switch in open position, which latter device returns to its inoperative position upon movement of said switch to its closed position.

30. In a motor vehicle, the combination with a coincidentally locking ignition switch, of a normally inoperative device movable by the operator to retain said switch in unlocked "off" position, said device returning to its inoperative position when the switch moves to its "on" position.

31. In a motor vehicle, the combination of a coincidentally locking ignition switch, a combination lock releasing means, and a normally inoperative device movable by the operator to retain said switch in unlocked "off" position, said device returning automatically to its inoperative position when the switch moves to its "on" position.

32. In a locking device, a member to be locked, means normally retaining said member in a given position, a key operated mechanism and a keyless mechanism adapted to move said retaining means to release said member, and means for rendering one of said mechanisms inoperative.

In testimony whereof I affix my signature.

MILTON TIBBETTS.